W. MORRISON.
SECONDARY BATTERY.
APPLICATION FILED JUNE 8, 1903.

940,043.

Patented Nov. 16, 1909.

Witnesses:
J B Weir
Robert W Weir

Inventor:
William Morrison
By Burkey & Durand
Attys.

UNITED STATES PATENT OFFICE.

WILLIAM MORRISON, OF CHICAGO, ILLINOIS.

SECONDARY BATTERY.

940,043.  Specification of Letters Patent.  Patented Nov. 16, 1909.

Application filed June 8, 1903. Serial No. 160,647.

*To all whom it may concern:*

Be it known that I, WILLIAM MORRISON, a citizen of the United States of America, and resident of Chicago, Cook county, Illinois, have invented a certain new and useful Improvement in Secondary Batteries, of which the following is a specification.

My invention relates to a certain improvement in connection with that type of electrical reversible galvanic battery in which there is an alkaline solution and zinc is one of the active elements. The improvement which I herein describe and claim is a part of the construction preferably employed by me in a battery of this type which I have broadly claimed in an application filed by me concurrently herewith and designated as Serial Number 160,645.

The object of my invention herein claimed is to provide an electrode support, which is capable of receiving and holding the active element of zinc and the amalgam therefor, in such a way as to preserve the support in a condition to properly receive and hold the zinc, and also whereby the zinc when deposited from the solution is in a practically fresh and clean state.

My present invention, as stated, is to be used in connection with that type of battery in which there is an alkaline solution together with a negative electrode the active element of which is zinc, disposed substantially horizontal in the bottom of the cell, which cell is preferably made of metal. This negative electrode, as shown and described herein, is constituted of a number of screens made of woven wire and superimposed one upon the other. After having been treated, in a manner to be described, these screens, which may be tightly and firmly bound together by sewing or soldering may be soldered tightly to the bottom of the cell. When thus in place within the cell an electrode support is provided which presents a porous roughened surface with openings therein permitting the penetration of the zinc and of the mercury which is used to amalgamate the zinc, in the manner to be described. The binding together of the various screens to form the electrode support or bed and the fastening of the said support to the cell itself on the bottom thereof provides a support having a maximum conductivity and in intimate contact with the cell itself.

Figure 1:
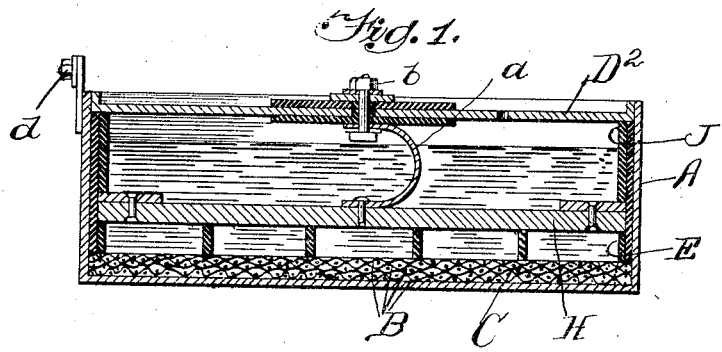
Figure 2:
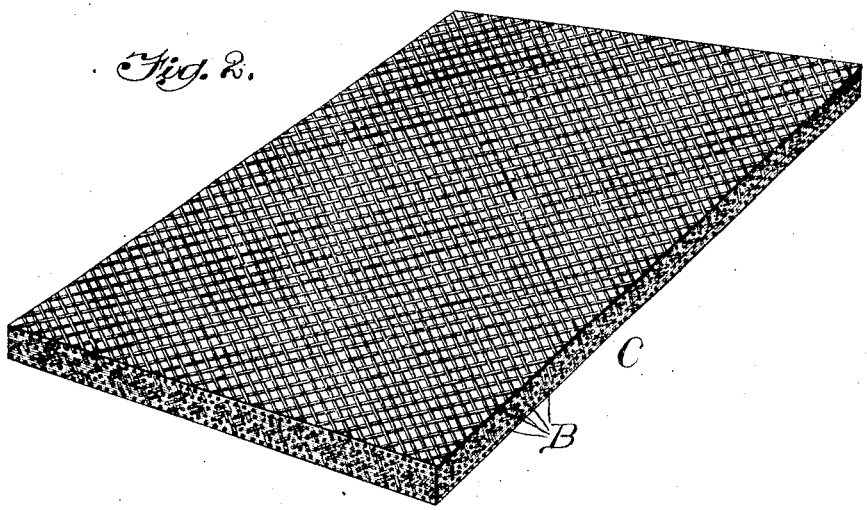
Figure 3:
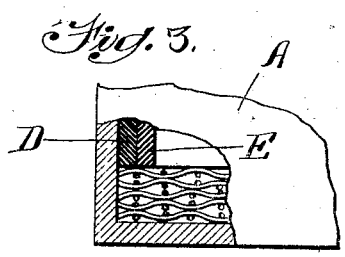

Figure 1 is a cross-sectional view of the complete cell. Fig. 2 is a perspective view of the electrode support. Fig. 3 is a detail view partly in cross-section.

In carrying out my invention, and as constituting one specific embodiment thereof, I provide preferably a metal cell A which may be of copper, iron, steel, or other suitable metal, within which I build up one upon the other in the bottom of the cell, a number of screens of woven wire or perforated metal, designed at B. These screens, which are preferably of copper, are preliminarily treated by plating them with silver, copper or other suitable metal, to form a metallic spongy and porous covering capable of absorbing and holding a large quantity of mercury. I then fill the spongy porous covering with mercury by dipping the screens into a vat of cyanid of mercury and then again into a vat of metallic mercury. Care, however, should be taken to wash out the cyanid. These screens are then electroplated in a solution of caustic potash, having zinc dissolved therein, until a necessary quantity of zinc is deposited upon the screens. The screens so prepared are then deposited one upon the other in the bottom of the cell, which cell has been previously plated and amalgamated on the bottom. (Fig. 3.) A sufficient number of these screens are so disposed to form a negative electrode C, of sufficient thickness or depth. Above this negative electrode is an insulating band D. I provide a grid-shaped protecting member E, of insulating material, having cells $e$ passing through it from top to bottom. Upon the top of this member E is the negative electrode H of aluminum, copper, silver, nickel, or other suitable material, of the character used in the well-known types of alkaline batteries. It should be preferably perforated, or so constructed, as to permit the gas to pass above the positive electrode and permit the free circulation of the liquid.

The insulating protector E is placed upon the top of the negative electrode and within the outer insulating band D. The positive electrode H is placed upon the top of the insulating protector C, and a second inner and insulating band J extending completely about the interior of the cell and resting against the outer insulating band D, rests at its lower edge, upon the marginal edge of the positive electrode. The cover $D^2$ sets within the cell A and bears upon the upper edges of the two insulating bands D and J, so that when the cover is pressed downwardly and soldered in place firmly the outer insulating band presses the marginal edges of the negative electrode firmly into place and the inner insulating band J pressing downward upon the positive electrode in turn causes the insulating protector E to firmly press upon the negative electrode beneath, thus binding the various screens of the positive electrode firmly together and to the bottom of the cell. If found desirable, these various screens may be sewed together or soldered, or otherwise fastened together, and the electrode support soldered to the cell itself, thus giving a greater amount of conductivity to the electrode support and more intimate contact with the cell itself.

A conductor $a$ extends to and is connected with a binding post $b$ which extends through the cover and is isolated therefrom and fastened thereto by insulating plates so secured in place as to prevent leakage. The other binding post $d$ is fastened to the metallic cell itself.

The solution may be of caustic potash or caustic soda, although I prefer the former. I prefer to purify the caustic potash by electro-plating between insoluble electrodes, with a suitable electric current, until the greater portion of the sediment is deposited on the electrodes or precipitated.

The negative electrode support consists of a number of wire screens, previously described, placed one upon the other in a sufficient number to provide a porous, open and conducting bed or receptacle for the reception of a sufficient quantity of zinc to give the desired discharge. The zinc is deposited upon the upper screens, or may be deposited on all of the screens, the screens with their openings permitting the residuum or foreign products to penetrate farther into the electrode and maintain the greater part of the active zinc portion of the electrode upon the top thereof.

In the operation of the battery, and in the first charge, the zinc having been previously electro-deposited, hydrogen is liberated and the positive electrode is oxidized in the well-known manner. In the discharge, the zinc is dissolved into the solution and the positive electrode is reduced in the well-known manner. If the electrodes are of greater capacity than the solution employed, the solution will dissolve and take up the zinc to its ultimate capacity and then the remainder of the zinc will be oxidized in the further continued discharge and consequent generation of current, this portion of the zinc remaining as an oxid of zinc in the negative electrode. And it is apparent that the positive electrode will be still further reduced.

It is also apparent that as the solution gradually loses its capacity to re-dissolve and take up the zinc, the quantity of oxid of zinc in the negative electrode will gradually increase in the continued operation of the battery. In the second charge the zinc in the solution is first deposited upon the negative electrode in the form of metallic zinc and there the liberated hydrogen reduces the oxid of zinc in the negative electrode to metallic zinc, the positive electrode being oxidized. In the further successive charges and discharges, as the solution loses its capacity to re-dissolve the zinc, more and more of the oxid of zinc remains in and upon the negative electrode.

In my very early experiments, on my present type of battery, I deposited zinc upon the bottom of a metal cell, but I found that the movements of the battery, such as it would receive in automobile work, would cause the solution to wash over the zinc and detach a part of it from its support and wash it to one side of the cell where it would short-circuit the electrodes. This action would be facilitated by not charging the battery at the proper rate, as the zinc would be spongy and loose and thus more readily detached and shifted. I then tried one screen resting upon and held against the bottom cell, but soon found that although the zinc bound itself into and around the screen, a sediment deposited the solution, and possibly from the positive electrode, settled upon the top of the screen, forming a coating which prevented the necessary adherence and density of the zinc deposit, and this led to the provision of a number of screens which provided a bed to hold the zinc and permit the sediment to penetrate farther into the electrode support. Therefore, in selecting these screens, care should be taken to select a screen with a sufficient mesh to provide free openings for the sediment and at the same time hold the zinc. By this means I found that the zinc was kept clean and practically free from foreign sediment, and was held in place permitting free circulation of the solution. As in the discharge the zinc is taken up into the solution the sediment settles farther toward the bottom of the cell, and in the charge fresh and clean zinc is deposited, compratively free from sediment, on the top of the electrode. The continued charge and discharge assist the natural tendency toward a settlement of the sediment farther into the electrode leaving the top portion of the electrode comparatively free from sediment and in condition to receive the zinc. This screen formation also, by reason of its mesh, tends to prevent the sediment from being washed out of the screen into the solution.

The negative electrode is thoroughly amalgamated before being placed in the cell, and this amalgam is preserved in each successive charge by providing an excess of mercury in the bottom of the cell. It is advisable to bind the screens tightly together and to the bottom of the cell so that the mercury may freely find its way from one screen to the other and thus maintain thorough and complete amalgamation. I found that under the reducing action of the charge on the negative electrode, the mercury adheres and binds with a large proportion of sediment, and also with the electrode itself, maintaining a thorough amalgamation for the reception of the deposited zinc and to prevent local action. This thorough amalgamation is made possible by reason of the location of the electrode in the bottom of the cell in substantially a horizontal position, and by the porous nature of the same. This is evident because the mercury may distribute itself through the electrode and cannot fall off from the electrode. The mercury is always in contact with the electrode.

What I claim as my invention is:

1. In an electric reversible galvanic battery in which there is a suitable alkaline solution and zinc is the active element, a support or grid therefor comprising a plurality of superimposed screens of woven wire secured together and disposed in a substantially horizontal position at or near the bottom of the cell, said active element of zinc being electro-deposited downward in the direction of gravity in the charge upon said support or grid, together with a positive electrode above the negative electrode.

2. In an electric reversible galvanic battery in which there is a suitable alkaline solution and zinc is the active element, a substantially horizontal support or grid therefor having openings or pores therein comprising a plurality of superimposed screens of woven wire secured together, and oxid of zinc in said openings or pores which is reduced electrically to metallic zinc in the charge, together with a positive electrode above the negative electrode.

3. In an electric reversible galvanic battery in which there is a suitable solution of alkali and zinc is the active element, a support or grid therefor comprising a plurality of superimposed screens of woven wire secured together and zinc electro-deposited from the solution in the direction of gravity upon said electrode support or grid, which said support or grid is substantially horizontally disposed, together with a positive electrode above the negative electrode.

4. In an electric reversible galvanic battery in which there is a suitable alkaline solution and zinc is the active element, a negative support or grid therefor having perforations or openings therein and disposed in a substantially horizontal position at or near the bottom of the cell, said active element of zinc being electro-deposited downward in the direction of gravity in the charge upon said negative support or grid, together with a positive electrode above the negative electrode, the zinc on said active element being in excess of the capacity of said solution to dissolve.

5. In an electric reversible galvanic battery in which there is an alkaline electrolyte, and zinc is the active element, a substantially horizontal negative support comprising a plurality of superimposed screens of woven wire secured together, and having zinc deposited thereon in excess of the capacity of the electrolyte to dissolve whereby after the electrolyte has dissolved all of said zinc up to its full capacity, the balance of said zinc is oxidized, together with a positive electrode above said negative electrode.

Signed by me at Chicago, Cook county, Illinois, this 6th day of June, 1903.

WILLIAM MORRISON.

Witnesses:
CHAS. C. BULKLEY,
WM. A. HARDERS.